US007817996B2

(12) United States Patent
Brunner

(10) Patent No.: US 7,817,996 B2

(45) Date of Patent: *Oct. 19, 2010

(54) METHOD AND SYSTEM FOR ADAPTIVE MODIFICATION OF CELL BOUNDARY

(76) Inventor: Christopher Brunner, 3623 18th St., Apt. 3, San Francisco, CA (US) 94110

( * ) Notice: Subject to any disclaimer, the term of this patent is extended or adjusted under 35 U.S.C. 154(b) by 1075 days.

This patent is subject to a terminal disclaimer.

(21) Appl. No.: 11/469,000

(22) Filed: Aug. 31, 2006

(65) Prior Publication Data

US 2008/0057932 A1 Mar. 6, 2008

Related U.S. Application Data

(62) Division of application No. 10/211,180, filed on Aug. 1, 2002, now Pat. No. 7,162,203.

(51) Int. Cl.
*H04Q 7/20* (2006.01)

(52) U.S. Cl. .................... 455/422.1; 455/522; 455/436; 455/442; 455/453

(58) Field of Classification Search .............. 455/422.1, 455/522, 436, 442, 453
See application file for complete search history.

(56) References Cited

U.S. PATENT DOCUMENTS 5,095,500 A * 3/1992 Tayloe et al. ............. 379/32.01
5,276,907 A * 1/1994 Meidan ...................... 455/436
5,392,331 A 2/1995 Patsiokas et al.
5,475,870 A 12/1995 Weaver et al.
6,038,448 A 3/2000 Chheda et al.
6,128,500 A 10/2000 Raghavan et al.
6,243,582 B1 6/2001 Lahtinen
6,266,529 B1 7/2001 Chheda
6,307,849 B1 10/2001 Tiedemann, Jr.
6,377,555 B1 4/2002 Lee et al.
6,804,521 B2 10/2004 Tong et al.
7,010,295 B1 3/2006 Zerlan et al.
7,110,295 B2 * 9/2006 Ishikawa et al. ....... 365/185.11

OTHER PUBLICATIONS

Stolowtiz Ford Cowger LLP; Listing of Related Cases; Jan. 6, 2010; 1 Page.

* cited by examiner

*Primary Examiner*—Sanh D Phu
(74) *Attorney, Agent, or Firm*—Stolowitz Ford Cowger LLP

(57) ABSTRACT

A method and system for reducing interference in a cellular radio communications network. At least one parameter affecting user terminals within a cell is adjusted such that the cell boundary is modified, such that interference in the network is reduced. In alternative embodiments the at least one parameter is adjusted adaptively.

19 Claims, 7 Drawing Sheets

METHOD AND SYSTEM FOR ADAPTIVE MODIFICATION OF CELL BOUNDARY

This application is a division of and claims priority to U.S. patent application Ser. No. 10/211,180, filed Aug. 1, 2002, issued on Jan. 9, 2007 as U.S. Pat. No. 7,162,203, all of which are incorporated by reference.

FIELD

Embodiments of the invention relate generally to cellular radio communication systems, and more particularly to the modification of individual cell topography in cellular radio communication systems to facilitate increased downlink capacity requirements.

BACKGROUND

The trend toward increased downlink capacity requirements in cellular radio communications systems is continuing with the expanding menu of high data rate services. Typical network planning strategies for cellular radio communication networks present drawbacks in regard to user handoff and system load balancing for an interference-limited, high-data-rate environment.

Cellular radio communication systems (hereafter "communication systems") are typically comprised of a number of cells, with each cell corresponding roughly to a geographical area. Each cell has an associated base station (BS) which is a local central cite providing access to the communication system to a number of radio transmitter/receiver units (user terminals (UTs)) within the cell. A BS includes at least one antenna and a transceiver system providing radio service within the cell. A base station of a typical communication system may have three antennas, oriented 120 degrees apart, defining three cells (also referred to as sectors). The BSs couple to base station controllers (BSCs) with each BSC serving a plurality of BSs. The BSCs also couple to a mobile switching center (MSC) which may interface other MCSs and the Public Switched Telephone Network (PSTN). Together, the BSs, BSCs and the MSCs form a cellular radio communication system or network. Network planners typically consider many factors in determining network features such as location of the BSs, BS transmission power (e.g., pilot power) as well as BS antenna physical characteristics (e.g., antenna downtilt). The factors considered may include population demographics, geographical formations, and UT use patterns, among others. Typically such network features remain static and cannot be adjusted to suit dynamic network requirements.

In typical radio cellular communications systems the BS communicates with each UT using a separate temporary radio channel. A channel is a set of two connections, the downlink, for transmitting to the UT and the uplink, for receiving from the UT. Due to the limited number of radio channel frequencies available to support such networks, the efficient use and reuse of available channels is critical to increasing network capacity. Frequency reuse is based on the concept of assigning a distinct group of channels to each neighboring cell, and then assigning the same group of channels to cells that are far enough away from each other so that their use of the same frequencies does not result in substantial interference. The number of cells that are assigned distinct channel groups determines the frequency reuse factor.

Some communication systems employ a low frequency reuse factor. For example, code division multiple access (CDMA) systems including cdma2000, wideband CDMA (W-CDMA), and IS95, and high data rate (HDR), as well as enhanced data GSM environment (EDGE), employ a frequency reuse factor of 1. That is, CDMA systems employ a direct sequence spread spectrum technology in which all of the available frequencies are used in each cell. Each UT within a cell is assigned a distinct orthogonal spreading code that uniquely identifies the UT and is used to decode transmissions from the BS. This technology increases the number of UTs that can be served by a BS by permitting all UTs within a cell to transmit simultaneously in the allocated frequency band. However, since each cell is using the entire frequency band, disjoint groups of channel frequencies are not available for use in neighboring cells. Using the entire frequency band can lead to mutual interference by proximate UTs located in different cells as described below.

In a typical communication system, each BS may serve an area comprised of multiple cells with the shape of each cell defined by the antenna pattern of one or more BS antennas. The size of each cell is determined by the pilot signal strength (pilot power) transmitted from the BS. The pilot signal is an unmodulated, direct-sequence spread spectrum signal, transmitted continuously by each BS, for each cell, which allows each UT to acquire the timing of the downlink channel. When a UT becomes operational, it measures the pilot power of the surrounding BSs. The UT establishes communication with the BS having the strongest pilot power.

Mutual Interference Between User Terminals

UTs in a CDMA system located within the same cell typically do not exhibit significant mutual interference due to the fact that each UT is assigned a mutually orthogonal downlink transmission code (code). Therefore, for UTs within a cell, the interference (other than noise and implementation effects) is virtually zero (if the multi-path spread is not too large). For such UTs, high-data-rate downlink transmissions are possible. This is because, in the CDMA system, total chip transmission rate remains constant, therefore, if a higher data rate is required the spreading factor of the codes must be reduced. The spreading factor of the codes is directly related to the amount of interference through which communication signals may be discerned. So, for UTs exhibiting little mutual interference the spreading factor may be reduced substantially thereby allowing a proportionally higher downlink data transmission rate. However, because each cell uses a different scrambling code set, the codes assigned to UTs of different cells are not guaranteed mutual orthogonality. Therefore, a high-data-rate transmission to such UTs may require a spreading factor reduced to such a degree that the communication signal cannot be discerned in the presence of mutual interference. In such case, a UT experiencing interference from a neighboring cell will request more power in order to maintain a signal-to-interference-plus-noise ratio (SINR) required, for example, by the quality of service (QoS) specified. The increased power to one UT increases the interference to the proximate UT of the neighboring cell. Eventually, some UTs get dropped and capacity is reduced. Therefore, proximate UTs located in different cells may not be capable of high-data-rate downlink transmissions due to mutual interference. Reducing this mutual interference between UTs is becoming more imperative as the trend toward greater downlink capacity requirements continues.

Load Balancing

Load balancing can also cause mutual interference in a high downlink data transmission rate environment. The number of simultaneous, active users (capacity) served within a particular cell may be limited by BS throughput or number of available codes. Thus, the number of users that may be supported by each cell is limited. For this reason it is desirable to distribute the number of active UTs as evenly as possible among the available cells (i.e., balance the load). There are a number of ways to effect load balancing. One such method involves adjusting the pilot power of one or more cells to change the size of the cell thereby encompassing more, or less, UTs to be served through a particular cell.

Moreover, because the codes assigned to each UT for uplink transmissions are not orthogonal as they are for the downlink transmissions, a balanced load is effective when the performance of the system is limited by BS throughput or number of UTs that can be served (uplink limited environment). However, if the limiting factor is interference between UTs, then a balanced load may actually exacerbate the problem. This is because inter-cell code orthogonality is not provided, and load balancing may cause several proximate UTs to be served by different cells having non-orthogonal spreading codes, thus increasing mutual interference. Such mutual interference is particularly problematic in a high-data-rate downlink environment. That is, because each of two, proximate, high-data-rate UTs having non-orthogonal codes may produce the effective equivalent mutual interference of a large group of typical UTs having non-orthogonal codes, the likelihood of such mutual interference causing degradation of system performance is increased in a high-data-rate environment.

Soft Handover

Another aspect of typical CDMA cellular radio communications systems that may degrade system performance through intercell interference in a high downlink data rate environment is that of "soft handover". If a UT is at a cell border, the power is, limited and the channel is weak. Soft handover is a way to compensate for the poor quality by serving the UT through two or more cells, this corresponds to UTs being in a region where two or more cell boundaries overlap. The UT generates a measurement report that includes the pilot power of each cell through which the UT is being served (active set) as well as the pilot power of the neighboring cells (neighboring set). This information is used to determine when the UT should be placed in, or taken out, of soft handover. The measurement report may include various performance measurements in addition to pilot power (e.g. a pilot power-to-interference ratio). This information is reported to the BSCs. Where the UT is being served through cells provided by BSs that are coupled to different BSCs, the measurement report may be forwarded to the MSC.

Soft handover works well for uplink transmissions, though for downlink transmissions, much of the gain of soft handover is lost. This is because soft handover provides large gains when the UT receives equal power through each of the two cells, but it is difficult to align transmission power so that the UT receives equal power through each of the two cells. Moreover if one of the channels is not fading, then soft handover is not necessary anyway. In the downlink, the interference due to being served through two or more cells using non-orthogonal codes may vitiate the benefits of soft handover.

SUMMARY

Embodiments of the invention provide a method and system for reducing interference in a cellular radio communications network. One or more parameters affecting user terminals within a cell is adjusted such that the cell boundary is modified, thereby redistributing a cell load such that interference in the network is reduced. In one embodiment the one or more parameters is adjusted adaptively.

Other features and advantages of embodiments of the invention will be apparent from the accompanying drawings and from the detailed description, which follow below.

BRIEF DESCRIPTION OF THE DRAWINGS

The invention may be best understood by referring to the following description and accompanying drawings that are used to illustrate embodiments of the invention. In the drawings.

DETAILED DESCRIPTION

Overview

An embodiment of the invention provides a method and system for reducing interference in a cellular radio communications network. At least one parameter affecting user terminals is adjusted such that the cell topography (i.e., size and shape, or boundary) is modified, thereby redistributing a cell load such that interference in the network is reduced. This allows use of the network by, for example, two proximate high-data-rate users that otherwise may have been dropped from the network due to mutual inter-cell interference in prior art communication systems. In one embodiment, at least one parameter is adjusted adaptively, that is, in response to changing network conditions. In another embodiment the pilot power and an antenna parameter are adjusted to increase network capacity and/or cell coverage. In such an embodiment network capacity may be increased through load balancing. One advantage of such an embodiment is to provide more intricate, and therefore more effective, load balancing. In still another embodiment, network planners may consider adaptive parameters when determining static network parameters, which will allow for more efficient network planning.

In the following description, numerous specific details are set forth. However, it is understood that embodiments of the invention may be practiced without these specific details. In other instances, well-known structures and techniques have not been shown in detail. Reference throughout the specification to "one embodiment" or "an embodiment" means that a particular feature, structure, or characteristic described in connection with the embodiment is included in at least one embodiment of the invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Figure 1:
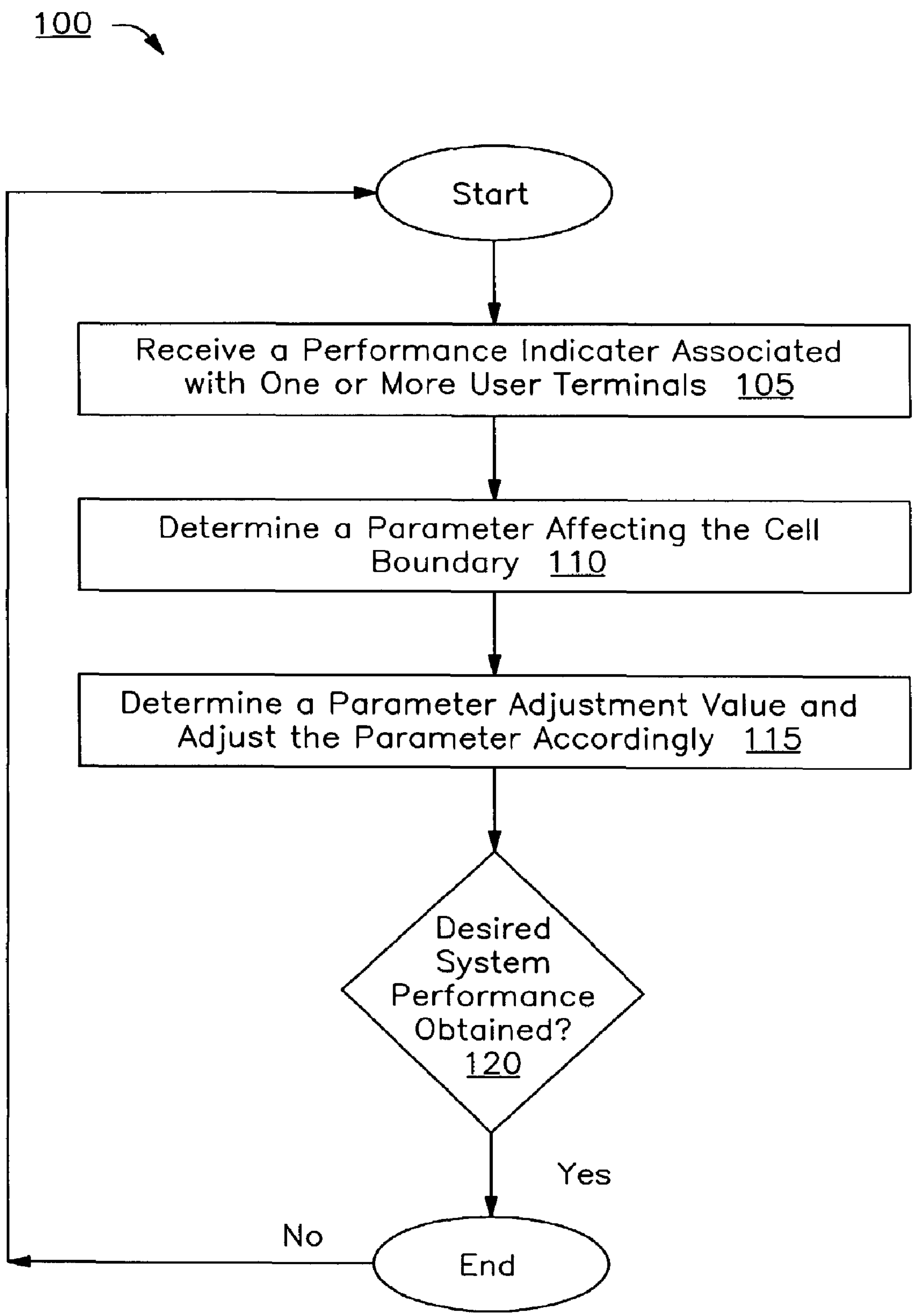
FIG. 1 is a process flow diagram of a method for adjusting parameters to affect system performance in accordance with one embodiment of the invention.

FIG. 1 is a process flow diagram in accordance with one embodiment of the invention. Process 100 shown in FIG. 1 begins at operation 105 in which a controller device, which may be the BS, BSC or MSC, obtains a performance indicator (e.g., performance measurement) associated with one or more user terminals. For example, consider two high-data-rate UTs each being served through a different cell (i.e., each has a non-orthogonal spreading code). Because each UT is requesting a high-data-rate, its spreading code factor will be proportionately reduced. This results in a high level of mutual interference, which in turn leads to requests from each UT, to their respective BSs, to increase transmission power. The requests for increased transmission power, or the pilot power-to-interference ratio included in the measurement report from the UTs may be used as an indicator of mutual inter-cell interference. In one embodiment, the performance indicator indicates whether a UT is in soft handover.

At operation 110, the controller device determines a parameter for affecting the cell boundary (size and/or shape) of the cells in an appropriate way. For example, in the case of two high-data-rate UTs exhibiting mutual interference, a parameter may be determined that affects the cell boundary in such a way that adjustment of the parameter will modify the boundary of one or both of the cells such that the mutually interfering UTs will both be included in one cell and excluded from the other. In another embodiment, this parameter may be pilot power, various antenna characteristic parameters, or combinations thereof.

At operation 115, the controller device determines the amount by which the determined parameter is to be adjusted, for example, based upon the performance measurement. The controller device then adjusts the parameter accordingly. The parameter may be adjusted adaptively in one embodiment. For example, if the two high-data-rate UTs exhibiting mutual interference are both in use in the network over a particular period of time, the parameter may be adjusted at such time and restored to its original value when the two high-data-rate UTs are no longer present in the network.

At operation 120 the process is repeated if the desired system performance is not obtained by the parameter adjustment of operation 115.

Figure 2:
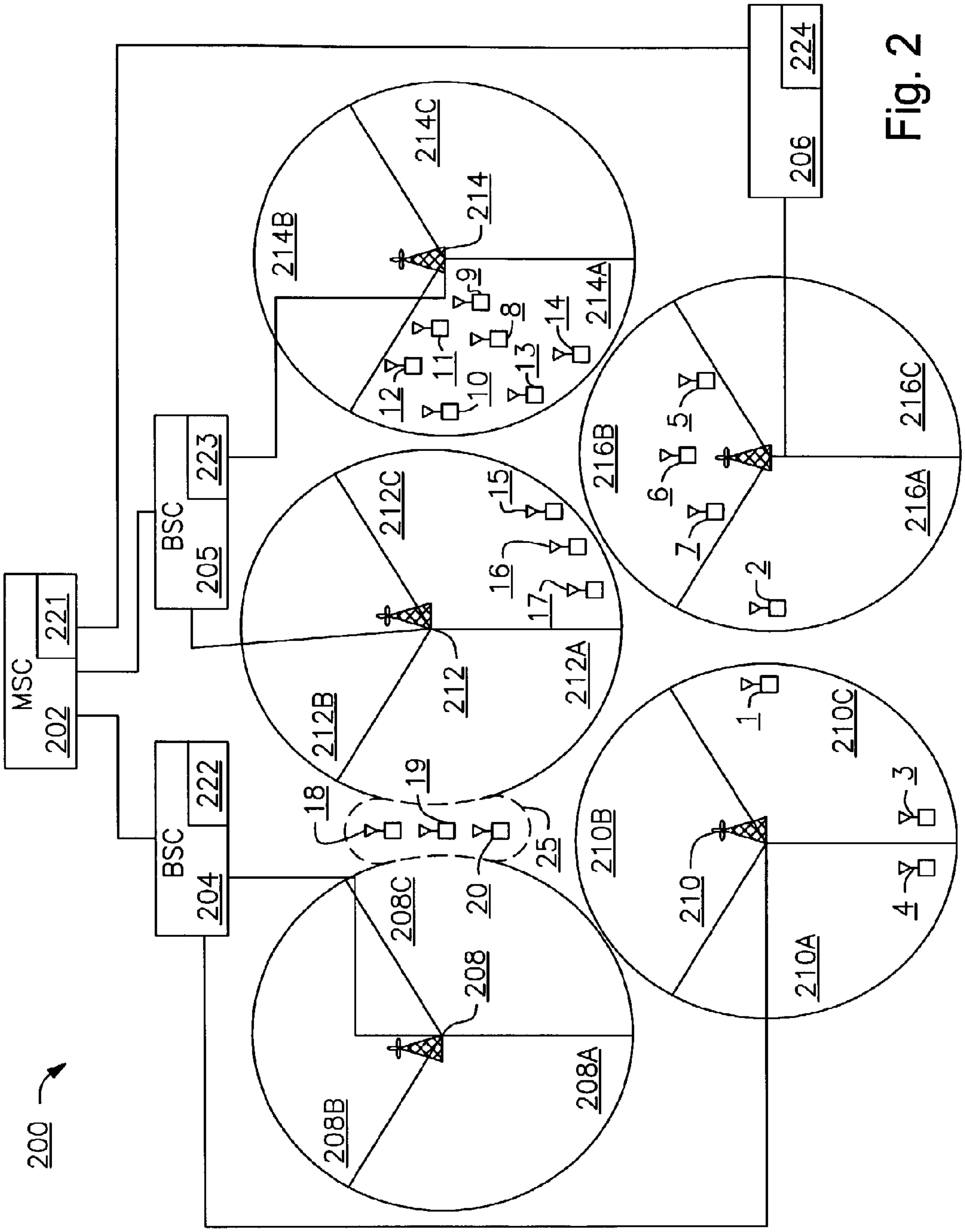
FIG. 2 illustrates an exemplary cellular radio communications network providing parameter adjustment functionality in accordance with an embodiment of the invention.

FIG. 2 illustrates an example cellular radio communications network providing parameter adjustment functionality in accordance with an embodiment of the invention. Network 200 includes MSC 202. Coupled to MSC 202 are BSCs 204, 205, and 206. BSC 204 has BSs 208 and 210 coupled to it, BSC 205 has BSs 212 and 214 coupled to it, and BSC 20 has BS 216 coupled to it. In accordance with an embodiment of the invention, the MSC 202, and each BSC, 204, 205, and 206, contain parameter adjustment functionality, labeled 221-224, respectively, which may include software, hardware, or a combination thereof. Alternatively, or additionally, each BS may contain such functionality. Each BS, 208, 210, 212, 214, and 216, serves an area comprised of three cells, labeled A, B, and C, for each BS. Network 200 also includes a number of UTs, 1-20, positioned to illustrate various embodiments of the invention.

UTs 1 and 2, located in cells 210C and 216A respectively, are high-data-rate UTs. Since UTs 1 and 2 are in different cells, they are assigned non-orthogonal spreading codes. Because they are high-data-rate UTs, they have a reduced spreading factor. This means that UTs 1 and 2 may exhibit high mutual inter-cell interference. The same situation applies to UTs 3 and 4 located in cells 210A and 210C respectively.

Cell 214A, through which seven UTs, UTs 8-14 are served, illustrates an overloaded cell (e.g., cell capacity is five UTs). Cell 214A may be overloaded due to the limit on the number of codes that can be assigned within the cell, or may be overloaded due to total cell throughput. In the latter instance, fewer high-data-rate UTs may effectively replace multiple typical data rate (e.g., voice) UTs in regard to overloading the cell. Nearby cells, 212C and 216B serve UTs 15-17 and 5-7, respectively and are not loaded to capacity.

UTs 18 and 19, located at the border of cells 208C and 212A, are high-data-rate UTs that are in soft handover region 25 and both are being served through cells 208C and 212A by BSs 208 and 212. UT 20, located at the border of cells 208C, 210B, and 212A, is also in soft handover region 25 and is being served through cells 208C, 210B, and 212A by BSs 208, 210, and 212. As described above, because for downlink transmission capacity requirements are often much higher, soft handover may not be desirable. That is, soft handover gain is vitiated by the mutual inter-cell interference caused by the UTs having non-orthogonal spreading codes (and due to the fact that it is difficult to equalize the power received from each of the two or more BSs serving the UTs).

Exemplary Applications

The following portion of the description will briefly describe how various embodiments of the invention may be applied to the performance degrading state of network 200.

Inter-Cell Interference

Figure 3A:
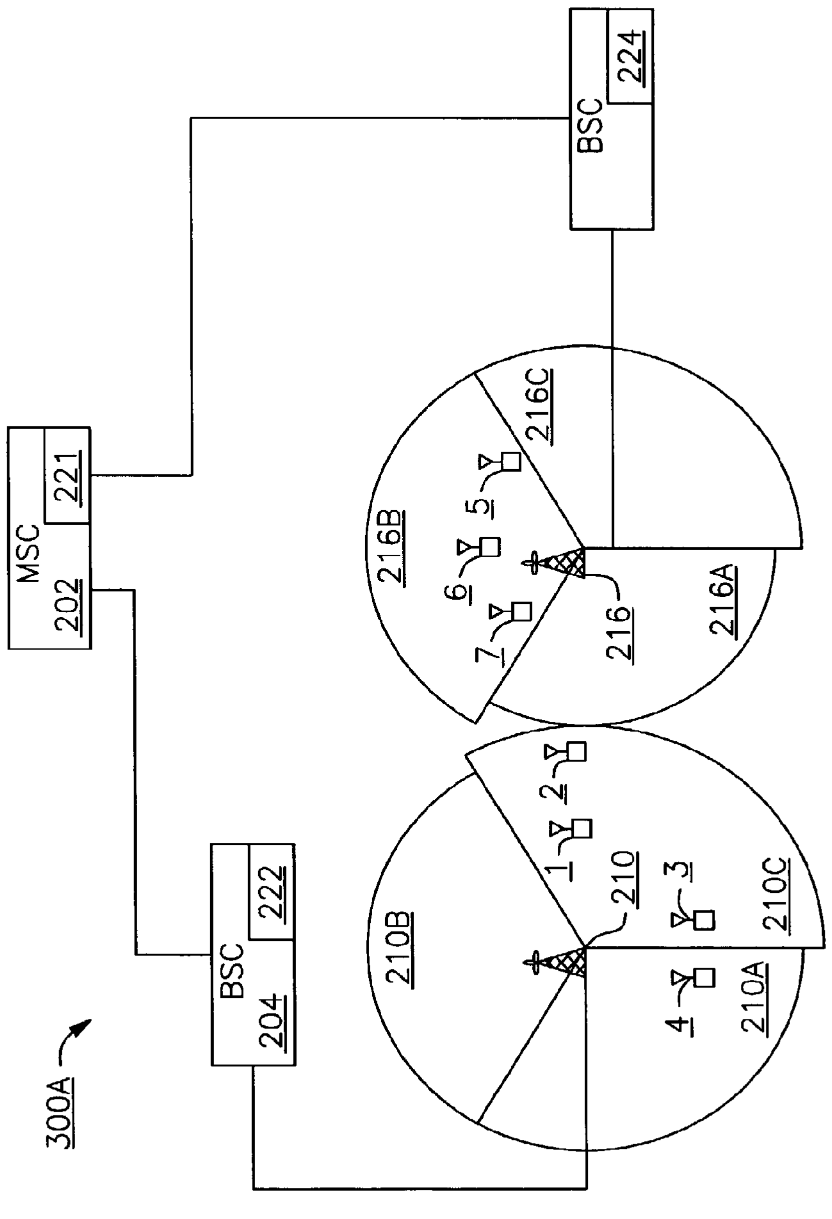
FIG. 3A shows the portion of network 200 containing BSs 210 and 216.
Figure 3B:
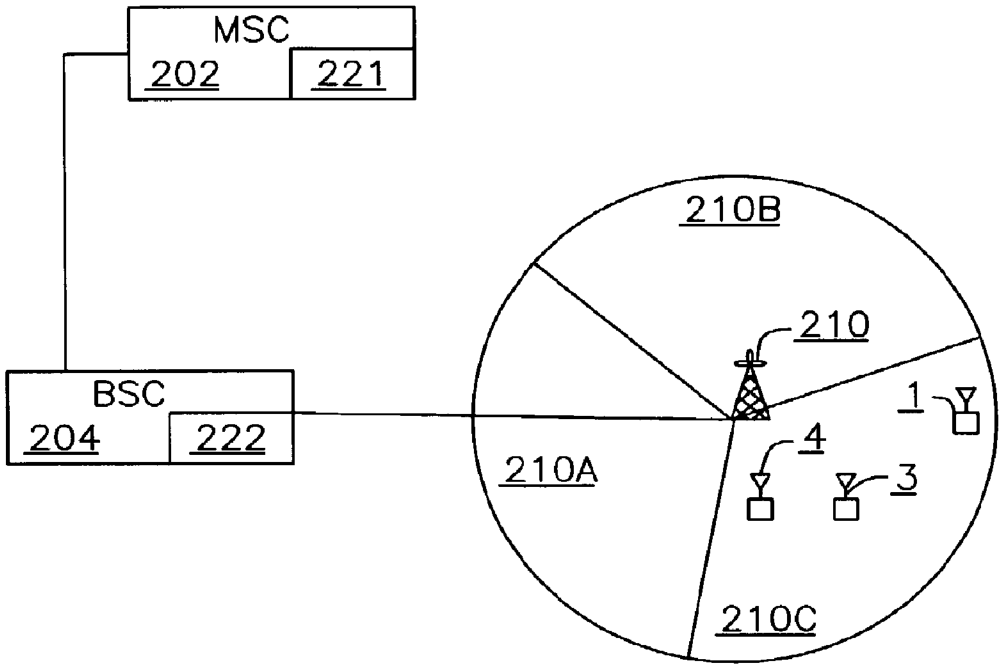
FIG. 3B shows the portion of network 200 containing BS 210.
Figure 3C:
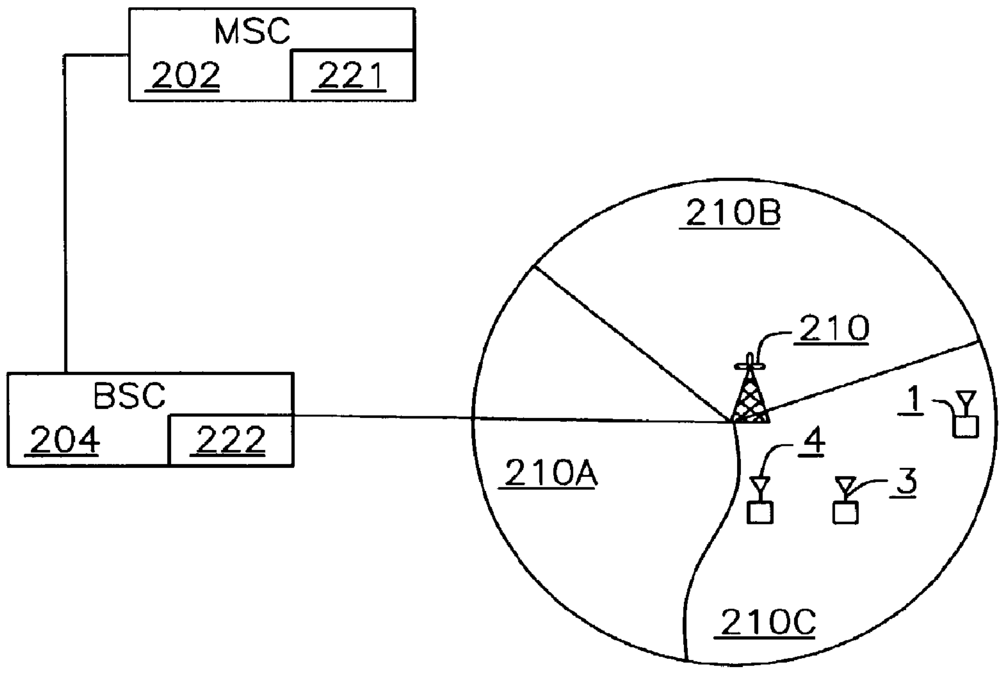
FIG. 3C shows the portion of network 200 containing BS 210 and illustrates the result of adjusting a different antenna parameter in order to eliminate inter-cell interference between UTs 3 and 4.

FIGS. 3A, 3B, and 3C illustrate application of the invention to reduce inter-cell interference in accordance with various embodiments.

FIG. 3A shows the portion of network 200 containing BSs 210 and 216. The cell boundary of cell 210C has been modified (extended) to encompass both UT 1 and UT 2, and the boundary of cell 216A been modified (retracted) to exclude UT 2, thereby eliminating inter-cell interference. That is, because UT 1 and UT 2 are now being served through the same cell, they are now assigned mutually orthogonal spreading codes. In one embodiment, this cell boundary modification is accomplished by an increase in pilot power for cell 210C and a corresponding reduction in pilot power of cell 216A. The determination of which cell boundary to extend and which to retract is made by random selection or based on consideration of various network conditions.

Because BSs 210 and 216 are coupled to different BSCs, namely BSCs 204 and 206, the operations of receiving the performance indicator, and determining and adjusting the appropriate parameter(s) of each cell are accomplished at the MSC 102. In an alternative embodiment, such operations are accomplished at the relevant BSC in conjunction with the MSC.

Because cell 210C now contains several high-data-rate UTs, UTs 1-3, while cell 216A now contains none, the load, with respect to the two cells, is unbalanced. However, as long as cell 210C is not overloaded (i.e., has not exceeded throughput or code capacity), the benefit of reduced inter-cell interference may outweigh the detriment of an unbalanced load.

FIG. 3B shows the portion of network 200 containing BS 210. The cell boundary of cell 210C has been shifted to encompass both UT 3 and UT 4, and the boundary of cell 210A has likewise been shifted to exclude UT 4, thereby eliminating intercell interference. Note that, in this case adjusting pilot power would not result in inclusion of both of the mutually interfering UTs in a single cell (other than by eliminating pilot power completely for cell 210A). Therefore a parameter other than pilot power is determined, in one embodiment, as described in reference to operation 110 of FIG. 1. For example, the illustrated shift in cell boundary is accomplished by appropriately adjusting the antenna azimuth (direction) of the BS antenna(s) that define(s) each cell. Because cells 210A and 210C are provided by the same BS, namely BS 210, the operations of receiving the performance indicator, and determining and adjusting the appropriate parameter(s) of each cell are accomplished at BSC 204 or MSC 102. In an alternative embodiment, such operations are accomplished at the relevant BS (e.g., BS 210).

FIG. 3C shows the portion of network 200 containing BS 210 and illustrates the result of adjusting a different antenna parameter in order to eliminate inter-cell interference between UTs 3 and 4. That is, it may not be desirable to shift the cell boundary. In this case, the cell boundary of cell 210C has been modified to encompass both UT 3 and UT 4, and the boundary of cell 210A has likewise been modified to exclude UT 4, thereby eliminating inter-cell interference. In one embodiment, such modification is accomplished by appropriately adjusting the antenna pattern of each cell. For example, if each sector is defined by multiple antennas, the phase shift of each antenna is electronically adjusted to alter the antenna pattern, thus modifying the cell boundary.

Load Balancing

Figure 4:
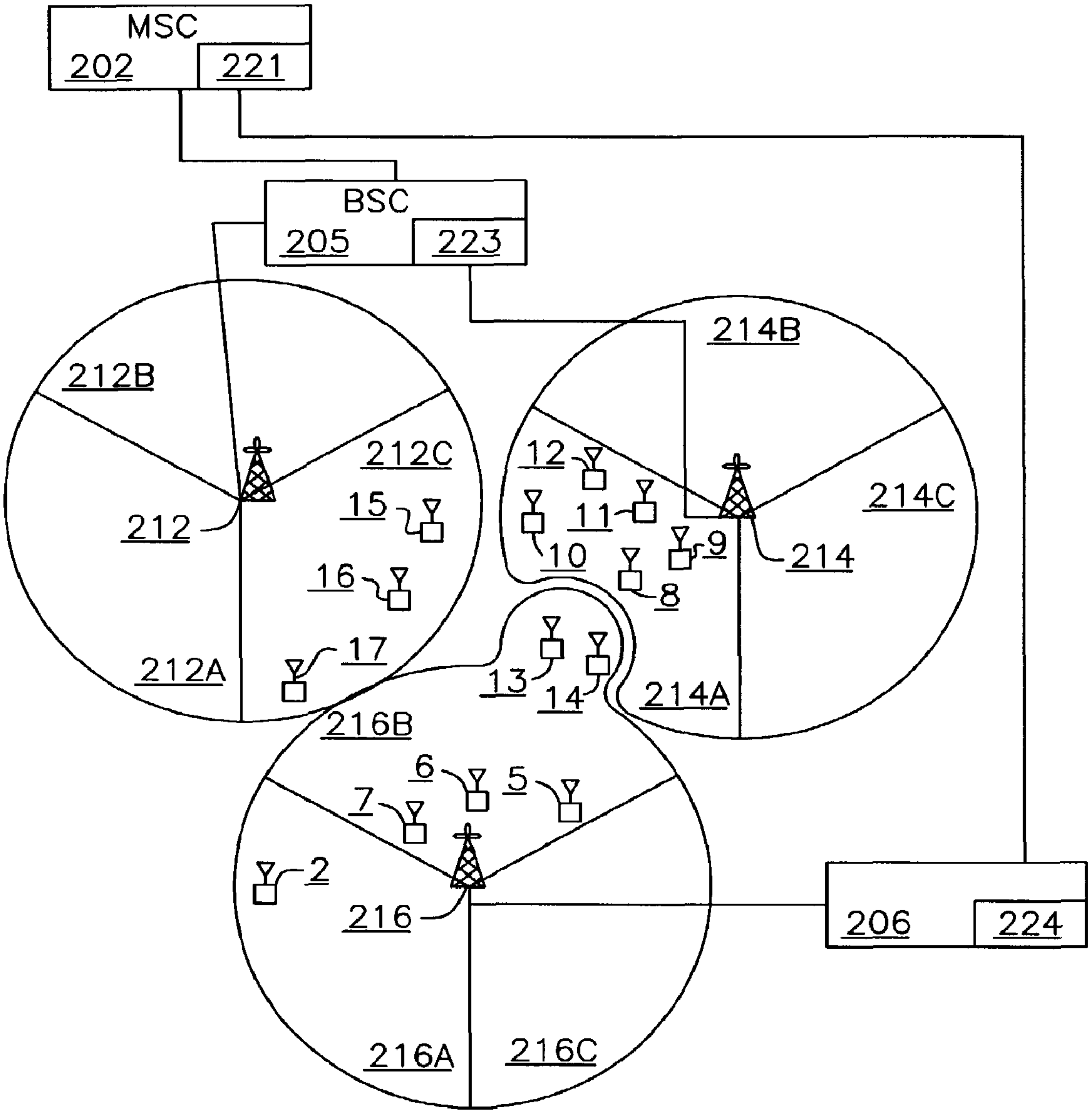
FIG. 4 illustrates application of the invention to effect load balancing in accordance with one embodiment.

FIG. 4 illustrates application of the invention to effect load balancing in accordance with one embodiment. FIG. 4 shows the portion of network 200 containing BSs 212, 214, and 216. The cell boundary of cell 216B has been modified such that cell 216B now encompasses UTs 6 and 7 as well as UTs 3-5 for a total of five UTs. The cell boundary of cell 214A has been modified, correspondingly such that cell 216A now excludes UTs 6 and 7 and includes only five UTs, namely UTs 8-12. Therefore, cell 214A is no longer overloaded and load balancing has been efficiently effected. The modification of the cell boundary for cells 214A and 216B may be accomplished by adjusting the pilot power and one or more antenna parameters of each cell (e.g., antenna pattern). That is, various antenna parameters may be adjusted in conjunction with adjusting pilot power depending on the desired modification of the cells' boundaries. Note that had the pilot power of cells 214A and 216B, alone, been modified (decreased and increased, respectively), the resultant cell boundary of cell 216B may have encompassed UTs 13-15 thereby overloading cell 216B. To avoid this, the pilot power of cell 212C may have to be adjusted.

Soft Handover

Figure 5:
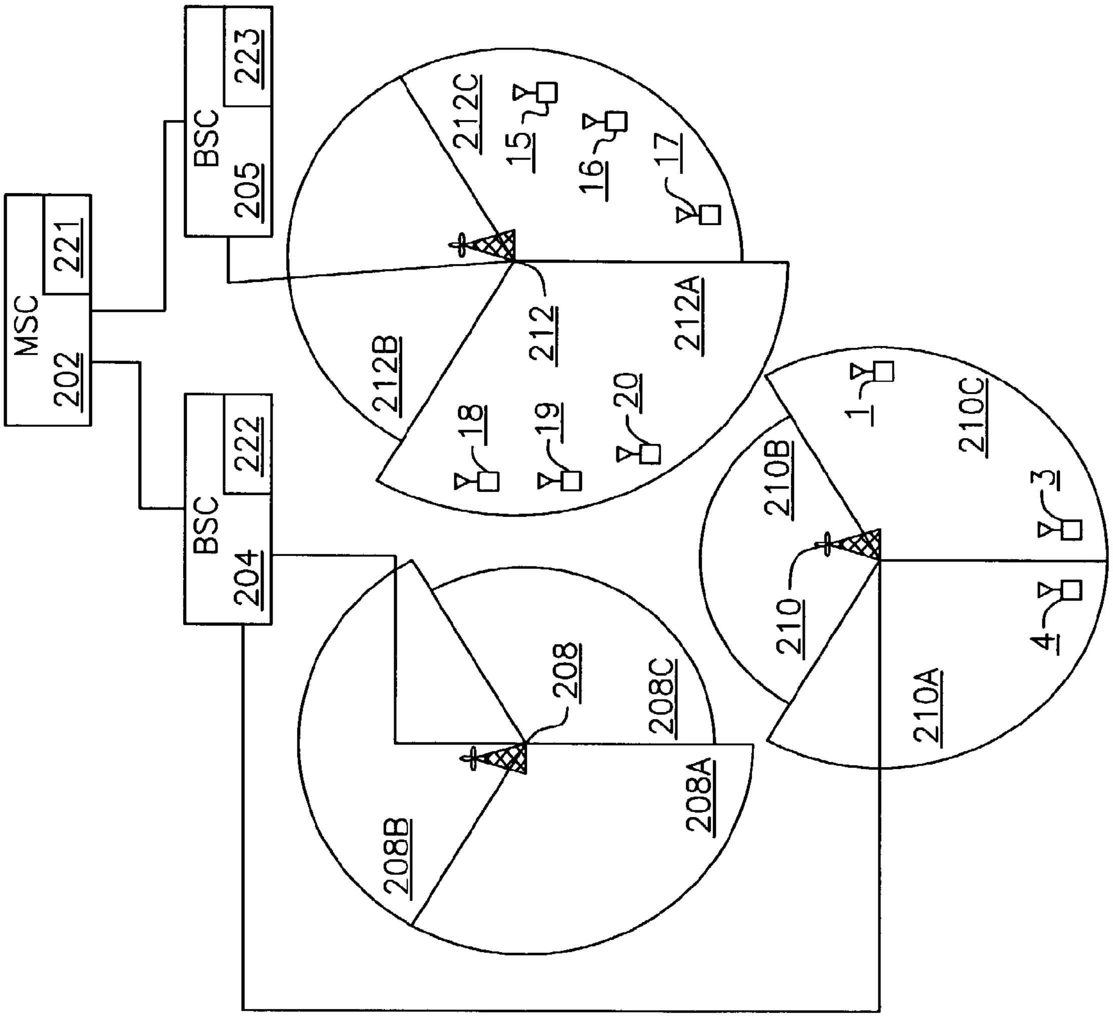
FIG. 5 illustrates application of the invention to remove UTs from soft handover in accordance with one embodiment.

FIG. 5 illustrates application of the invention to remove UTs from soft handover in accordance with one embodiment. FIG. 5 shows the portion of network 200 containing BSs 208, 210, and 212. The cell boundary of cell 212A has been modified such that cell 212A now encompasses UTs 18, 19 and 20, which were in soft handover. The cell boundary of cell 212A has been modified by adjusting pilot power, one or more antenna parameters, or a combination of pilot power and antenna parameters. In one embodiment, removing UTs 18, 19, and 20 from soft handover involves modification of the cell boundaries of cells 208C and 210B through the adjustment of one or more parameters (e.g., reduction of pilot power), as shown.

Because BSs 208, 210, and 212 are coupled to different BSCs, namely BSCs 204 and 205, the operations of receiving the performance indicator, and determining and adjusting the appropriate parameter(s) of each cell may be accomplished at the MSC 102.

As discussed above in reference to FIG. 3C, the determination of which cell boundary to modify such that the cell includes the UTs in the soft handover region is made by random selection for one embodiment. In an alternative embodiment, the determination of which cell boundary to modify is based on consideration of various network conditions.

Figure 6:
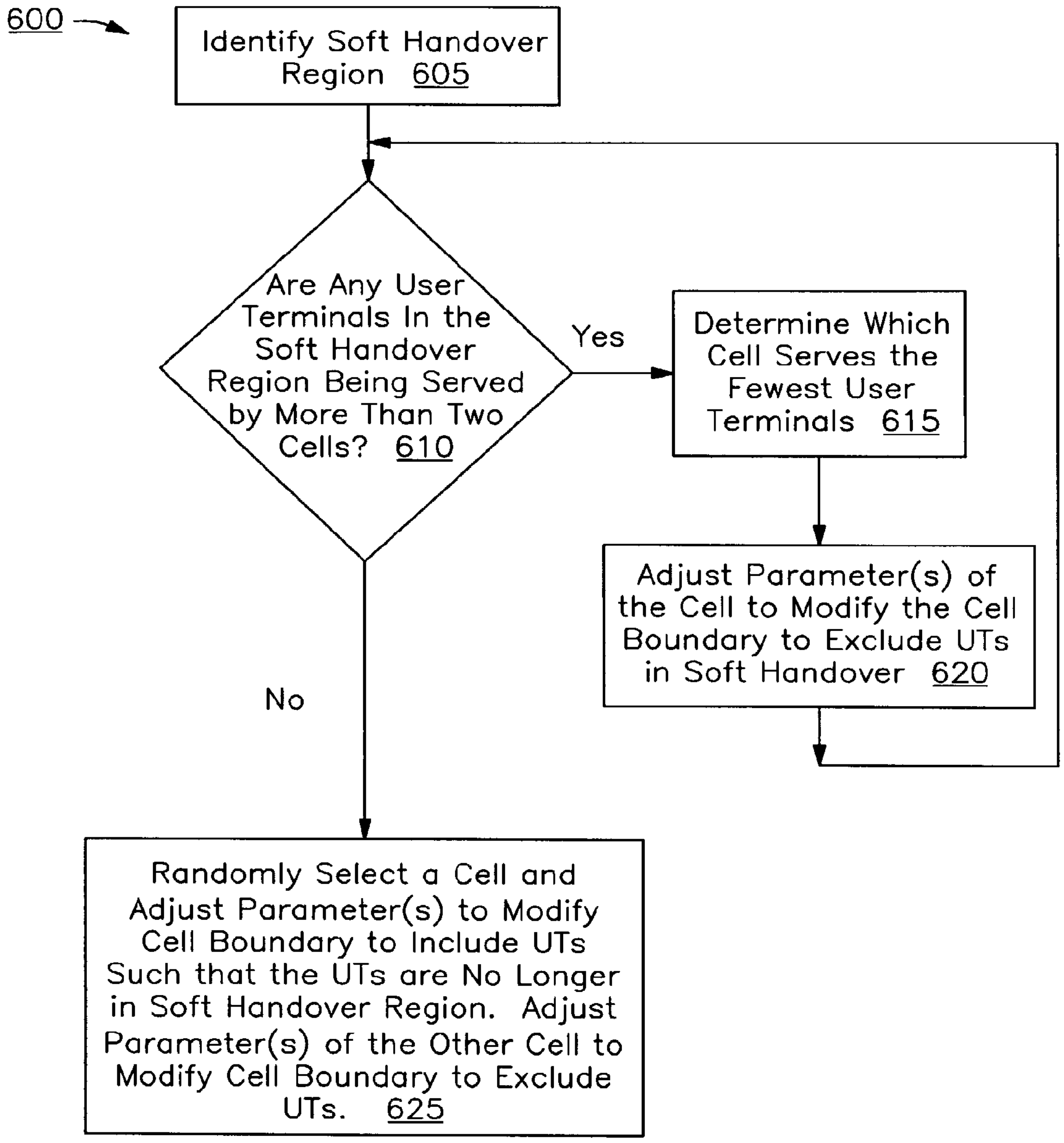
FIG. 6 is process flow diagram of an exemplary algorithm to determine which cell will include the UTs in soft handover.

FIG. 6 is process flow diagram of an exemplary algorithm to determine which cell will include the UTs in soft handover.

Process 600 begins with operation 605 in which soft handover regions are identified. In one embodiment of the invention, this is done by analysis of the measurement report sent to the BSs by each UT. The measurement report identifies the cells (two or more for a UT in soft handover) that the UT is communicating through. These cells are known as the active set. The measurement report also includes the pilot power for each cell of the active set as well as other information.

At operation 610 a determination is made as to whether the cells are providing equal resources to UTs in the soft handover region. In one embodiment, a determination of resources provided is the number of UTs a cell is serving, the total cell throughput, or a function of total UT throughput and total UT transmission power. For example, referring again to FIG. 2, cell 210B is serving only one UT (UT 20).

At operation 615, if the provided resources are not equal, then a determination is made as to which cell is providing the least resources. This is done by examining the active sets of the UTs in soft handover, for example, where the resource is the number of UTs being served.

At operation 620 at least one parameter of those cells providing the least resources is adjusted to modify the cell boundary to exclude the UTs in the soft handover region. For example, referring again to FIG. 2, since cell 210B serves only one UT in soft handover (UT 20), the pilot power of cell 210B is reduced such that UTs in the soft handover region are excluded from cell 210B (as shown in FIG. 5).

At operation 625, if the resources provided by each cell are equal, then a random selection is made between the cells. One or more parameters of one or more cells is adjusted to modify the cell boundaries so that the UTs in soft handover are included within only one cell, such that the UTs are no longer in a soft handover region, and are excluded from the other cell(s). With the boundaries shifted, interference drops, and therefore may allow a reduction in total transmitted pilot power.

General Matters

Embodiments of the invention may be applied to reduce inter-cell interference, to provide more efficient load-balancing, and to avoid the drawbacks of soft handover. While several embodiments have been described in relation to their application in a high downlink data rate environment, embodiments of the invention may be likewise applicable to typical data rate (voice) environments and uplink environments. Many other applications are possible as well, such as the determination of various network parameters based upon the ability to adaptively adjust other parameters, during network planning.

The invention includes various operations. It will be apparent to those skilled in the art that the operations of the invention may be performed by hardware components or may be embodied in machine-executable instructions, which may be used to cause a general-purpose or special-purpose processor or logic circuits programmed with the instructions to perform the operations. Alternatively, the steps may be performed by a combination of hardware and software. The invention may be provided as a computer program product that may include a machine-readable medium having stored thereon instructions, which may be used to program a computer (or other electronic devices) to perform a process according to the invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the invention may also be downloaded as a computer program product, wherein the program may be transferred from a remote computer to a requesting computer by way of data signals embodied in a carrier wave or other propagation medium via a communication cell (e.g., a modem or network connection). The operations may be performed at a BS, a BSC, a MSC, or performed by a combination of these control devices.

Embodiments have been herein described in reference to a CDMA system, but the invention is not limited to such systems or even to systems employing a low frequency reuse factor. Importantly, while the invention has been described in the context of a cellular radio communication system, it can be applied to a wide variety of different systems in which data are exchanged. Such systems include voice, video, music, broadcast and other types of data systems without external connections. Many of the methods are described in their most basic form but operations can be added to or deleted from any of the methods without departing from the basic scope of the invention.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method, comprising:

receiving an indication of an increase in an inter-cell interference between a first user terminal, being served by a first cell, and a second user terminal, being served by a second cell; and adaptively adjusting a pilot power of one or both of the first cell and the second cell to modify a cell boundary of one or both of the first cell and the second cell such that the first user terminal and the second user terminal are served by a same one of the first cell or the second cell to thereby reduce interference in a cellular communications network.

2. The method of claim 1, further comprising:

adaptively adjusting an antenna parameter of one or both of the first cell and the second cell to further modify a cell boundary of one or both of the first cell and the second cell.

3. The method of claim 2, wherein the antenna parameter is selected from the group consisting of an antenna downtilt, an antenna azimuth, an antenna pattern, an antenna height, or an antenna location.

4. A method, comprising:

measuring at least one performance metric associated with a first terminal served by a first cell or a second terminal served by a second cell;

adjusting at least one parameter configured to affect a cell boundary of the first or second cells responsive to the measuring such that the first terminal and the second terminal are served by a same one of the first cell or the second cell; and repeating the measuring and adjusting until the performance metric meets or exceeds a performance threshold.

5. The method of claim 4, further comprising:

adaptively adjusting a pilot power of the first or second cells.

6. The method of claim 5, wherein adaptively adjusting the pilot power and adjusting the at least one parameter occurs responsive to the performance metric.

7. The method of claim 6, wherein measuring the performance metric includes obtaining the performance metric from a report from the first or the second terminals.

8. The method of claim 7, wherein the performance metric includes a pilot power, a ratio of pilot power to interference for an active set, or a ratio of pilot power to interference for a neighboring set.

9. A network, comprising:

means for measuring at least one performance metric associated with a first terminal served by a first cell or a second terminal served by a second cell; and means for adjusting at least one parameter configured to affect the cell boundary of the first or second cells responsive to the measuring such that the first terminal and the second terminal are served by a same one of the first cell or the second cell; and means for repeating the measuring and adjusting until the performance metric meets or exceeds a performance threshold.

10. The network of claim 9, wherein the means for adjusting includes means for adaptively adjusting a pilot power of the first or second cells responsive to the performance metric.

11. The network of claim 9, wherein the performance metric includes a pilot power, a ratio of pilot power to interference for an active set, or a ratio of pilot power to interference for a neighboring set.

12. A network, comprising:

a mobile switching center;

at least one base station controller configured to communicate with the mobile switching center; and at least one base station coupled to the at least one base station controller, the at least one base station configured to provide a first cell to serve a first terminal and a second cell to serve a second terminal;

wherein the mobile switching center or the at least one base station controller are configured to:

measure a performance metric associated with the first terminal or the second terminal; and adaptively adjust at least one antenna parameter to modify a cell boundary of the first cell or the second cell such that the first user terminal and the second user terminal are served by a same one of the first cell or the second cell until the measured performance metric meets or exceeds a performance threshold.

13. The cellular radio communications network of claim 12, wherein the mobile switching center or the at least one base station controller are configured to adaptively adjust pilot power of the first cell or the second cell to further modify the cell boundary.

14. The cellular radio communications network of claim 12, further comprising redistributing a load on the first cell or the second cell.

15. A machine-readable medium having one or more executable instructions stored thereon that, in response to execution by a computing device, caused the computing device to perform operations comprising:

measuring at least one performance metric associated with a first terminal served by a first cell or a second terminal served by a second cell;

adjusting at least one parameter configured to affect the cell boundary of the first or second cells responsive to the measuring such that the first terminal and the second terminal are served by a same one of the first cell or the second cell; and repeating the measuring and adjusting until the performance metric meets or exceeds a performance threshold.

16. The machine-readable medium of claim 15, wherein the operations further comprise:

adaptively adjusting a pilot power of the first or second cells.

17. The machine-readable medium of claim 16, wherein the operations further comprise:

adaptively adjusting the pilot power and the at least one antenna parameter responsive to the performance metric.

18. The machine-readable medium of claim 17, wherein the operations further comprise:

obtaining the performance metric from a report from the first or the second terminals.

19. The machine-readable medium of claim 18, wherein the performance metric includes a pilot power, a ratio of pilot power to interference for an active set, or a ratio of-pilot power to interference for a neighboring set.

* * * * *

UNITED STATES PATENT AND TRADEMARK OFFICE

CERTIFICATE OF CORRECTION

PATENT NO. : 7,817,996 B2
APPLICATION NO. : 11/469000
DATED : October 19, 2010
INVENTOR(S) : Brunner It is certified that error appears in the above-identified patent and that said Letters Patent is hereby corrected as shown below:

Title Page, item (56), under “Other Publications”, in Column 2, line 1, delete “Stolowtiz” and insert -- Stolowitz --.

Signed and Sealed this
Fifteenth Day of May, 2012

David J. Kappos
*Director of the United States Patent and Trademark Office*